United States Patent [19]

Bell et al.

[11] 4,048,865

[45] Sept. 20, 1977

[54] TRANSMISSION BELTS

[75] Inventors: Richard Bell, Dumfries, Scotland; Takao Sato, Yamatokoriyama, Japan; Chitta Ranjan Lahiri, Naugatuck, Conn.

[73] Assignees: Uniroyal Limited, Midlothian, Scotland; Uniroyal, Inc., New York, N.Y.; Unitta Company Limited, Osaka, Japan

[21] Appl. No.: 675,358

[22] Filed: Apr. 9, 1976

[30] Foreign Application Priority Data

Apr. 11, 1975 United Kingdom .............. 14957/75

[51] Int. Cl.$^2$ .......................... F16G 1/00; D04H 1/00
[52] U.S. Cl. ............................... 74/231 R; 74/231 C; 428/260; 428/268; 428/273; 428/295; 428/415; 260/887; 260/823; 156/137

[58] Field of Search ................ 74/231 R, 231 C, 237, 74/232, 233, 234; 260/887, 823; 156/137, 138, 140; 428/156, 167, 260, 268, 273, 295, 290, 292, 413, 414, 442

[56] References Cited

U.S. PATENT DOCUMENTS

| 3,078,205 | 2/1963 | Saver et al. | 156/140 |
|---|---|---|---|
| 3,078,206 | 2/1963 | Skura | 156/140 |
| 3,657,393 | 4/1972 | Komuro et al. | 260/887 |
| 3,700,650 | 10/1972 | Hani et al. | 260/887 |
| 3,876,590 | 4/1975 | Shimogawa et al. | 260/887 |

Primary Examiner—William R. Dixon, Jr.
Attorney, Agent, or Firm—Jay L. Chaskin

[57] ABSTRACT

A toothed power transmission belt comprising a body, transversely extending teeth positioned along at least one face of said body, and an inextensible tensile member embedded in said body, the material of said body comprising a blend of an epihalohydrin having a nominal Mooney viscosity of not more than 50 and an epihalohydrin having a nominal Mooney viscosity of not less than 50.

13 Claims, No Drawings

TRANSMISSION BELTS

This invention relates to toothed power transmission belts. There is known a power transmission belt having an inextensible tensile member having teeth bonded to one side and a backing layer on the other side, the teeth and backing layer constituting an integral body made of an elastomeric material.

Toothed power transmission belts are used extensively in the automotive industry. There is now intensive investigation into the problem of reducing pollution due to exhaust gases from internal combustion engines, and one approach to this is to design engines to run at a higher temperature than at present, to give substantially complete combustion of the fuel and to burn off residual exhaust gases. Conventional engines run at a temperature of about 75° C to 90° C and it is proposed that high temperature engines should run at temperatures up to about 120° C. Existing toothed belts break down very rapidly as a result of working at temperature around 120° C and the object of the invention is to provide a belt that will operate satisfactorily at such temperatures.

According to the present invention a toothed power transmission belt comprises a body with transversely extending teeth along at least one of its faces and an inextensible tensile member embedded in the body, the material of the body comprising a blend of an epihaloydrin having a nominal Mooney viscosity of not more than 50 and an epihalohydrin having a nominal Mooney viscosity of not less than 50.

All Mooney viscosity figures given herein are ML 1 + 4 at 100° C.

By use of a blend of epihalohydrin materials in belt bodies, belts can be made which will have satisfactory life in service at temperatures up to about 120° C, and in tests belts have been run at this temperature for periods exceeding 500 hours without failure. Such belts are also capable of operation at low temperatures.

The ratio of lower viscosity ephihalohydrins to higher viscosity epihalohydrins in the body material is preferably from 60:40 to 75:25 by weight. This ratio is conveniently chosen so that the blended body material has a Mooney viscosity of less than 50. This simplifies manufacture of the belts.

The epihalohydrin polymers used in the belt are preferably epichlorohydrin and may be homopolymers or copolymers of epichlorohydrin with one or more other monomers. Particularly preferred for the higher viscosity polymer in the blend is a copolymer of epichlorohydrin and ethylene oxide, the epichlorohydrin/ethylene ratio preferably being from 60:40 to 70:30 by weight, while the lower viscosity polymer is preferably an epichlorohydrin homopolymer, conveniently with 3614 40% by weight chlorine content.

Conveniently the body material includes a minor proportion of a diene/acrylonitrile copolymer. Thus, butadiene-acrylonitrile or isoprene-acrylonitrile copolymers can be used, and may improve the hardness properties of the blend. The diene-acrylonitrile copolymer is conveniently present in less than 5% by weight of the total weight of the epihalohydrins. Particularly preferred is a cold polymerised acrylonitrile-butadiene copolymer having an acrylonitrile content of from 34% to 41% by weight.

The blend of polymers will generally be compounded with conventional compounding ingredients at their usual levels, and a typical compound will thus include one or more acid acceptors, antioxidants, curatives, accelerators and fillers, and may also have an antiozonant. The inextensible tensile member conventionally used in toothed belts is cords of glass fibre, although textile cords such as the aromatic polyamide known as "Kevlar" can be used. It is important that the tensile member has good adhesion to the body and that this adhesion should not break down at the high operating temperatures.

Preferably the inextensible tensile member is bonded to the body by an adhesive comprising a non-volatile isocyanate in a suitable organic solvent, for example xylene, trichloroethylene, toluene or a mixture of two or more or these.

The adhesive can be applied directly to the glass cord, or the cord can be pretreated, for example by coating it with a heat-resistant material or by solutioning the cord in a conventional resin-formaldehyde latex bath.

The preferred adhesive utilises an organic solvent and is manufactured and sold by Hughson Chemicals, Lord Corporation and is available under the name "Chemlok 402". Belt manufacture using the adhesive-coated cord may be carried out immediately after solvent evaporation, or the treated cord may be stored and used up to six months later without deterioration of the adhesive properties.

It is common practice to cover the toothed surface of power transmission belts with a protective jacket fabric, the preferred fabric being a woven nylon and a belt according to the invention preferably has such a jacket. The adhesive system between the jacket fabric and the body must again be able to withstand the high operating temperatures.

Preferably this adhesive is based on a solution of a silica-modified blend of epihalohydrin and acrylonitrile/butadiene copolymer.

Specific embodiments of belts according to the invention will now be described in more detail by way of example only.

EXAMPLE 1

A transmission belt, 1.9 cm. in width, was made up from the following components in accordance with the manufacturing method described in British Pat. No. 875,283 and U.S.A. Pat. No's 3,078,205 and 3,078,206.

1. Body Compound

The body compound had the following composition:

|  | Parts by Weight |
|---|---|
| Herclor 'H' | 70.00 |
| Herclor 'C' | 30.00 |
| Breon 1112 | 2.25 |
| Dibasic lead phosphate (acid acceptor) | 5.00 |
| Dibasic lead phthalate (acid acceptor) | 7.00 |
| Ethylene thiourea (curative) | 1.50 |
| Nickel dibutyl dithiocarbamate (antioxidant) | 0.80 |
| Nickel dimethyl dithiocarbamate (antioxidant) | 1.50 |
| FEF black | 40.00 |
| Paraplex G25 (polyester-type plasticiser) | 10.00 |
| Cellobond H831 (modified phenolic resin with hexamethylene tetramine added) | 2.00 |
| Zinc stearate | 1.00 |
| A.C. Polyethylene 617A | 2.00 |

Herclor 'H' is an epichlorohydrin homopolymer with a chlorine content of 38.4% by weight, a specific gravity of 1.36 and a nominal Mooney viscosity of 48. Herclor 'C' is a copolymer of 65% epichlorohydrin and 35% ethylene oxide, with a chlorine content of 25%, a specific gravity of 1.27 and a nominal Mooney viscosity of 55. Both polymers are saturated, high molecular weight, aliphatic polymers with chloromethyl side chains. Breon 1112 is a copolymer of 64% butadiene and 36% acrylonitrile, with a nominal Mooney viscosity of 45.

2. Tensile Member

Parallel glass cords of standard 95F or 96F cords solutioned in conventional manner with 15 to 20 parts by weight of a resin-formaldehyde latex and then with 4 to 10 parts by weight of Chemlok 402.

3. Jacket

Woven nylon fabric 2421 with 203 g/sq. meter pick up of jacket adhesive as shown below.

4. Jacket Adhesive

The jacket adhesive had the following composition:

|  | Parts by Weight |
| --- | --- |
| Herclor 'H' | 70.00 |
| Breon 1001 | 30.00 |
| Dibasic lead phosphate | 5.00 |
| Dibasic lead phthalate | 7.00 |
| Nickel dibutyl dithiocarbamate | 0.80 |
| Nickel dimethyl dithiocarbamate | 1.50 |
| FEF black | 25.00 |
| Ultrasil VN3 (silica) | 10.00 |
| Ethylene thiourea | 1.50 |
| Silane A189 (a mercapto functional silane) | 0.10 |

Breon 1001 is a copolymer of 60% butadiene and 40% acrylonitrile having a specific gravity of 1.00 and a Mooney viscosity of 95. This mixed compound was then added to a solution comprising 15 parts by weight Cellobond H831 and 498 parts by weight of methyl ethyl ketone as solvent.

The Herclor 'H' in the above composition could be replaced by an epichlorohydrin copolymer, for example Herclor 'C'.

Tests were carried out to determine the adhesion between the various components of the belt. The adhesion of coated jacket fabric to body compound was measured by a peel test and found to be 11.5 kg/cm. The samples were prepared by curing the jacket material to a 0.64 cm. wide strip of body compound under a surface pressure of 703.1 kg/sq. meter for 30 minutes at 153° C. Adhesion of the treated glass cord to moulded test samples of body compound was measured by the 'H' test (ASTM D1817 - Method A) and the adhesion values were as follows:

|  | Kg/cm |
| --- | --- |
| Natural (before ageing) | 18.0 |
| 48 hours at 150° C | 19.4 |
| 120 hours at 150° C | 20.2 |
| 168 hours at 150° C | 21.4 |

These values will give good belt performance, and it will be noted that the adhesion increases on ageing of the belt.

The belt made in accordance with the foregoing example was compared, before ageing, with a control consisting of a conventional neoprene belt, with the following results:

|  | Example | Control |
| --- | --- | --- |
| Tensile Strength (Kg./cm) | 984 | 945 |
| Jacket adhesion (Kg./cm) | 12.07* | 11.55 |
| Tooth Shear (Kg./Tooth) | 224 | 255 |
| Compound Hardness (Shore A) | 73 | 70 |

*Tooth tear occurred rather than adhesive failure.

Jacket adhesion, tooth shear and hardness of the belt were also measured after aging of the belt at 135° C for various periods as follows:

| Ageing period (hrs) | 24 | 48 | 72 | 168 | 336 |
| --- | --- | --- | --- | --- | --- |
| Jacket adhesion (Kg./cm) | 11.55 | 17.32 | 16.59 | 10.50 | Jacket tear |
| Tooth shear (Kg./tooth) | 274 | 336 | 254 | 285 | 183 |
| Hardness (Shore A) | 76.5 | 79 | 77 | 87 | 85 |

Tensile strength was measured by mounting the belt, with the teeth facing outwards, around 100 mm. diameter cylinders and pulling the cylinders away from one another at 2.5mm/min until the belt failed. Jacket adhesion was measured by cutting a length of the jacket and tooth structure from the belt body along the tooth root line, gripping the separated body section and tooth section in the upper and lower grips respectively of a tensile testing machine and moving the lower grip downwardly at a speed of 50 mm/min. Maximum load as the jacket is torn down over each of three successive teeth was measured and the lowest of these three maxima was taken as the jacket adhesion. Tooth shear was measured by clamping a section of the belt between a flat plate and a plate profiled to fit over a single tooth, holding the clamp and applying a downward load to the belt at a rate of 25 mm/min. The measurement shows the load required to shear the tooth.

A belt made in accordance with the foregoing example was test run on an engine at a temperature of 118° C – 121° C. During the test run the belt was run alternately at 700 RPM and 4000 RPM for 1 minute at a time, the acceleration and deceleration periods each being five seconds. After 500 hours there were no cracks in the rubber or the jacket of the belt, no severe wear patterns and no loosening of either the jacket or the glass cord relative to the body of the belt.

EXAMPLE 2

A transmission belt was made as described in Example 1 save that the body compound was modified by omitting the Breon 1112 and replacing the nicket dibutyl dithiocarbamate by 1.00 part of phenothiazine as an alternative antioxidant.

A belt made in accodance with this Example will give similar performance figures to those obtained for the belt of Example 1.

We claim:

1. A toothed power transmission belt comprising a body having transversely extending teeth positioned along at least one face of said body, and an inextensible tensile member embedded in said body, the material of said body and said teeth comprising a blend of an epihalohydrin having a nominal Mooney viscosity of not more than 50 and an epihalohydrin having a nominal Mooney viscosity of not less than 50, wherein the ratio of the lower viscosity epihalohydrin to the higher viscosity epihalohydrin in said body material is from 60:40 to 75:25 by weight.

2. A toothed power transmission belt as claimed in claim 1 wherein the Mooney viscosity of said blend of epihalohydrins is less than 50.

3. A toothed power transmission belt as claimed in claim 1 wherein the lower viscosity polymer is an epichlorohydrin homopolymer and the higher viscosity polymer is a copolymer of epichlorohydrin and ethylene oxide.

4. A toothed power transmission belt as claimed in claim 3 wherein said epichlorohydrin homopolymer has a 36–40% by weight chlorine content.

5. A toothed power transmission belt as claimed in claim 3 wherein the epichlorohydrin/ethylene ratio in said copolymer is from 60:40 to 70:30 by weight.

6. A toothed poer transmission belt as claimed in claim 1 wherein said body material includes a minor proportion of a diene-acrylonitrile copolymer.

7. A toothed power transmission belt as claimed in claim 6 wherein said diene-acrylonitrile copolymer is present in less than 5% by weight of the total weight of said epihalohydrins.

8. A toothed power transmission belt as claimed in claim 7 wherein said diene-acrylonitrile copolymer is butadiene-acrylonitrile.

9. A toothed power transmission belt as claimed in claim 1 wherein said inextensible tensile member is bonded to said body by an adhesive comprising a nonvolatile isocyanate in an organic solvent.

10. A toothed power transmission belt as claimed in claim 9 wherein said organic solvent is a mixture of xylene and trichloroethylene.

11. A toothed power transmission belt as claimed in claim 9 wherein said inextensible tensile member is treated with a resin-formaldehyde latex before application of said adhesive.

12. A toothed power transmission belt as claimed in claim 1 wherein said teeth are covered by a protective jacket fabric bonded to said body by an adhesive solution comprising a silica-modified blend of epihalohydrin and acrylonitrile/butadiene copolymer.

13. A toothed power transmission belt as claimed in claim 12 wherein the epihalohydrin in said adhesive solution is one of said epihalohydrins used for said belt body.

* * * * *